United States Patent
Williams

[11] Patent Number: 6,142,785
[45] Date of Patent: Nov. 7, 2000

[54] EDUCATIONAL SET OF GLOVES

[76] Inventor: Trudy Williams, 5316 Sussex La., Pace, Fla. 32571

[21] Appl. No.: 09/133,095

[22] Filed: Aug. 12, 1998

[51] Int. Cl.[7] .............................. G09B 19/02; G09B 1/00; G09B 23/04; A41D 19/00

[52] U.S. Cl. .......................... 434/205; 434/211; 434/188; 2/159

[58] Field of Search .................................. 2/159; 434/81, 434/188, 205, 211

[56] References Cited

U.S. PATENT DOCUMENTS

| | | | |
|---|---|---|---|
| D. 331,834 | 12/1992 | Wallace | D2/619 |
| D. 334,658 | 4/1993 | Ivie | D2/619 |
| D. 335,024 | 4/1993 | Moffitt | D2/619 |
| D. 368,352 | 4/1996 | Torres | D2/619 |
| 3,258,858 | 7/1966 | Cariffe, Jr. | 2/159 |
| 4,519,781 | 5/1985 | Boyd | 434/156 |
| 4,922,850 | 5/1990 | Conley | 116/222 |
| 5,507,649 | 4/1996 | Troudet | 434/233 |
| 5,554,032 | 9/1996 | Troudet | 434/233 |
| 5,571,020 | 11/1996 | Troudet | 434/233 |
| 5,655,910 | 8/1997 | Troudet | 434/233 |

*Primary Examiner*—Paul J. Hirsch
*Assistant Examiner*—Michael B. Priddy
*Attorney, Agent, or Firm*—Carnes, Cona and Dixon

[57] ABSTRACT

An educational device and method is provided. Comprising a first glove having a first set of digits for receiving the fingers and thumb of one hand and a second glove having a second set of digits for receiving the fingers and thumb of the other hand. A first set of indicia is provided. Located on each digit is an indicia. The indicia located on each digit on the first glove represent a first set of indicia. This first glove further includes a second set and a third set of indicia. The indicia located on each digit of the second glove represent a fourth set of indicia. This second glove includes a fifth and sixth set of indicia. The first set of indicia and the fourth set of indicia are used to learn to count while the second indicia and the fifth indicia are used to learn right from left. The fifth indicia and the sixth indicia are used to learn geometry.

10 Claims, 2 Drawing Sheets

EDUCATIONAL SET OF GLOVES

BACKGROUND OF THE INVENTION

1. Field of the Invention

The present invention relates to an educational device and more particularly to an educational device that is worn and is designed and structured to educate in the areas of counting, color recognition, differentiating shapes, and conceptualizing between the left and right.

2. Background of the Prior Art

Educating a child, especially a young child, is not an easy task. Small children have a very short attention span and the overriding goal of the educator is to keep the child's attention. As young children are prone to probe the world about them utilizing their hands, it is imperative that any approach toward educating a child involves the child's hands. As such, several devices have been developed to address these needs. One such device is disclosed in U.S. Pat. No. 3,258,858 issued to Cariffe, Jr. In this patent there is disclosed a pair of gloves which includes indicias for addressing which glove should be worn on which hand. Each glove includes a half of a face, and when placed together, these indicias form a whole face. Hence, the face, when formed will illustrate which hand will accept which particular glove. Though effective, these gloves do not address nor teach the concept of the left side from the right side, but rather, which glove must fit which hand. Yet another device is disclosed in U.S. Pat. No. 4,519,781, issued to Boyd. In this patent there is disclosed a glove with a plurality of tags which are removably secured thereto. Though this glove does address a teaching method, this method appears to be difficult to follow and one that may inherently be cumbersome to utilize, especially for young children, who may have limited dexterity. The use of removable tags provides a device with pieces that can be lost or destroyed, and worse, swallow by a young child, thus becoming a choking hazard. In addition, the missing pieces can result in a non-operative device, defeating its intended purpose.

Accordingly, it is seen that there exists a need to provide for an educational apparatus which can be worn and that will successfully teach the fundamental areas of counting, color recognition, shapes, and the concept of left and right. This educational apparatus should be suited for young children and provides for a learning process that is fun, safe, exciting, yet challenging.

As will be seen, the present invention achieves its intended purposes, objectives and advantages, by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The educational set of gloves and method of the present invention addresses the aforementioned concerns of educating a child who may inherently possess a limited attention span. The educational set of gloves and method position the educational media directly onto the child's hands. From this vantage point, the child's interest is maintained relatively longer than with standard visual or audio media. The educational gloves and method teach a child counting, left from right, color, and various geometric shapes.

The educational set of gloves and method are comprised of a first glove having a first set of digits for receiving the fingers and thumb of one hand and a second glove having a second set of digits for receiving the fingers and thumb of the other hand. A first set of indicia is provided, one each on a respective one of the first set of digits, and a second indicia is provided on the first glove, while a third set of indicia is provided, one each on a respective one of the second set of digits and a fourth indicia is provided on the second glove. Each of the first set of indicia and the third set of indicia is a unique number (preferably consecutive) between one and ten (or other range as desired) with one through five on the first glove and six through ten on the second glove and are used to learn basic counting. The second indicia and the fourth indicia are each a unique letter to correspond between right (letter R) and left (letter L) and are used to learn right from left. A fifth indicia may be provided on the first glove and a sixth indicia may be provided on the second glove. The fifth indicia and the sixth indicia are each in a particular geometric shape and are used to learn geometry. All indicia on the two gloves may be raised to enable the child to have a tactile stimulus of the desired indicia. Furthermore, at least one of the first set of digits is of a different color relative to other of the first set of digits or is of a different color with respect to at least one of the second set of digits in order to teach a child different colors. Accordingly, it is the object of the present invention to provide for an educational set of gloves which successfully educates a child and overcomes the deficiencies, drawbacks and shortcomings of previous educational gloves and teaching methods.

Yet another object of the present invention is to provide an educational set of gloves which is aesthetically pleasing and one that will captivate a child's attention and which will teach by providing an environment that is fun and enjoyable.

Still another object of the present invention to be specifically enumerated herein, is to provide an educational set of gloves in accordance with the preceding objects and which will conform to conventional forms of manufacture, be of simple construction and easy to use so as to provide a device that would be economically feasible, long lasting and relatively trouble free in operation.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENT

Figure 1:
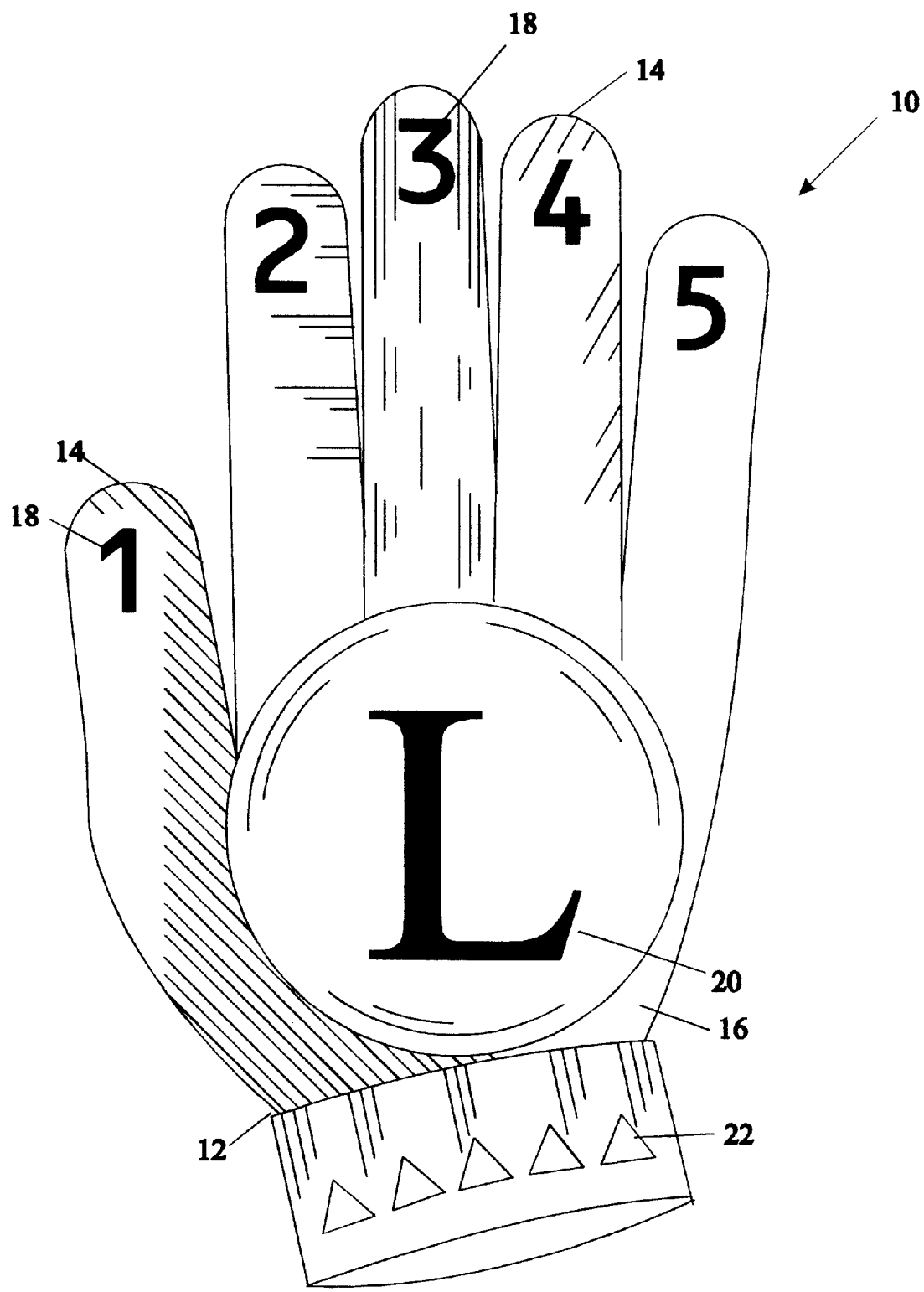
FIG. 1 is a top plan view of the first glove of the educational set of gloves of the present invention.

Referring now to the drawings, it is seen that the educational device of the present invention, generally denoted by reference numeral 10, is comprised of a first glove 12 having a first plurality of digits 14 and a first body 16. Each individual digit receives a finger or a thumb of a wearer of the first glove 12. A first set of indicia 18 are provided, one each of the first set of indicia 18 located on a respective one of the first plurality of digits 14. As seen, each of the first set of indicia 18 is a number between one and five (or other range as desired). Hence, each digit will represent a particular number. This particular number is illustrated by way of the first set of indicia. For an added benefit and visibility, this first set of indicia can be raised. A second indicia 20 is located on the first body. As seen, the second indicia 20 is the letter L, (or other appropriate letter or symbol, the exact choice being language specific) to indicate that the left hand is to be received within the first glove 12. A third set of indicia 22 are provided on the first body 16 with this set of indicia 22 being of a particular geometric shape, such as the illustrated triangles.

Accordingly, it is seen that this glove is divided into sections. The first section being the digit or finger area. This digit or finger area includes the first set of indicia. A second or middle section is provided and this second or middle section will provide for the side recognition indicia to be located centrally thereon. A third or lower section is provided and this third or lower section includes the third set of indicia. This third set of indicia will be located below the second indicia, and thus will be situated in proximity to the wearer's wrist when worn. These sections are clearly seen in FIG. 1. The use of these sections provide a device which is aesthetically pleasing, as well as rendering a glove which offers structure to the wearer. Such a structural layout will innately provide a device that is easy to follow and utilize and thus will encourage children to not only wear the glove, but partake in learning the indicias at each and every section of the glove designed to be worn on the opposite hand from the first glove, to consequently provide for a pair of gloves, 12 and 24, respectively. This second glove includes a second plurality of digits 26 and a second body 28, with each individual digit receiving a finger or a thumb of a wearer of the second glove. A fourth set of indicia 30 is provided, one on each of the fourth set of indicia 30 located on a respective one of the second plurality of digits 26. As seen, each of the fourth set of indicia 30 is a number between six and ten (or other range as desired). These numbers can be continuous with the first glove, as seen. Thereby providing for the first glove to be workable with the second glove. A fifth indicia 32 is located on the second body 28. As seen, the fifth indicia 32 is the letter R, (or other appropriate letter or symbol, the exact choice being language specific) to indicate that the right hand is to be received within the second glove 24. A sixth set of indicia 34 are provided on the second body 28 with this set of indicia being of a particular geometric shape such as the illustrated squares.

Figure 2:
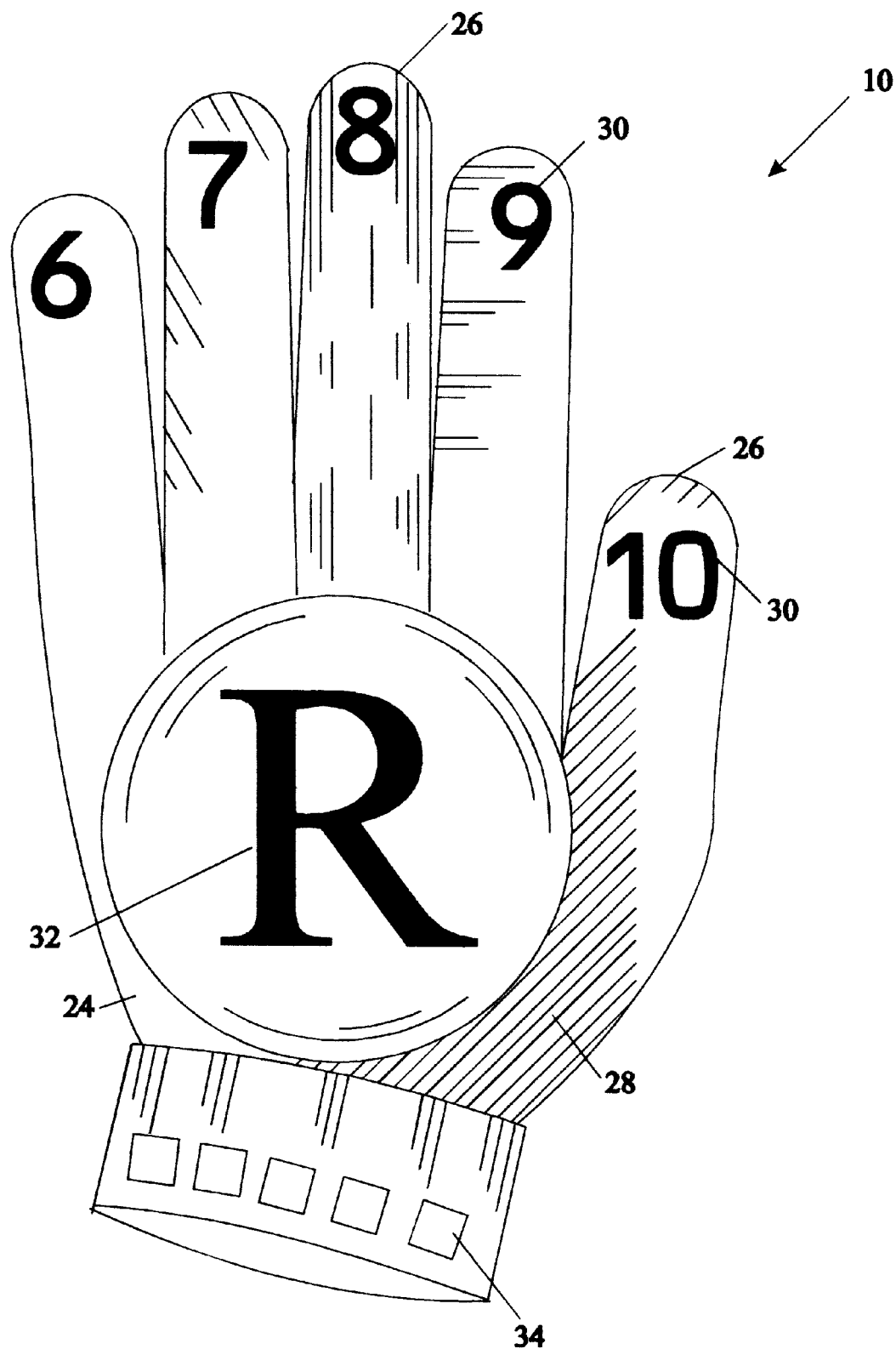
FIG. 2 is a top plan view of the second glove of the educational set of gloves of the present invention.

As illustrated, this second glove is similar in design as the first glove, except that it is used on a different hand, and thus the first and second sets of indicias will be different, yet corresponding to each other. As also seen, this second glove is divided into sections. The first section being the digit or finger area. This digit or finger area includes the first set of indicia. A second or middle section is provided and this second or middle section will provide for the side recognition indicia to be located centrally thereon. This will provide for the finger area to be located above the center area. Thus the digits are inherently located above the center area. A third or lower section is provided and this third or lower section includes the third set of indicia. This third set of indicia will be located below the second indicia, and thus will be situated in proximity to the wearer's wrist when worn. These sections are clearly seen in FIG. 2. As previously discussed, the use of these sections provide a device which is aesthetically pleasing, and one which is organized. This organized structure will offer a device that is not intimidating to utilize and thus will encourage children to not only wear the glove, but partake in learning the indicias at each and every section of the glove In order to use the educational gloves 10 of the present invention, a user dons the first glove 12 onto his left hand and the second glove 24 onto his right hand. The user uses the first set of indicia 18 located on the first set of digits 14 and the fourth set of indicia 30 located on the second set of digits 26 to learn to count from one to ten (or other appropriate range as provided) and uses the second indicia 20 and the fifth indicia 32 as a visual que to distinguish between left and right. The third indicia 22 and the sixth indicia 34 are used as visual stimulus for learning various geometric shapes.

While the invention has been particularly shown and described with reference to an embodiment thereof, it will be appreciated by those skilled in the art that various changes in form and detail may be made without departing from the spirit and scope of the invention.

I claim:

1. An educational set of gloves comprising;

a first glove and a second glove;

each glove includes a top section, a middle section, and a lower section;

said top section of said first glove and said second glove includes a first plurality of digits;

said middle section is sandwiched between said top section and said lower section to provide for said top section to be located above said middle section and said lower section to be located below said middle section;

a top set of indicia is located on said first section of each glove and said first set of indicia being located on a single side of each glove;

a middle set of indicia is located on said second section of each glove and said second set of indicia being located on a single side of each glove;

a bottom set of indicia is located on said third section of each glove and said third set of indicia being located on a single side of each glove;

said first set of indicia includes consecutive numerical indicia for teaching counting;

said second set of indicia includes a representation for a left side for said first glove and a representation for a right side for said second glove; and said third set of indicia includes a set of indicia having a geometric shape.

2. An educational set of gloves as in claim 1 wherein said digits are each represented via a different color.

3. An educational set of gloves as in claim 1 wherein said geometric shape of said first glove is different from said geometric shape of said second glove.

4. An educational set of gloves as in claim 1 wherein said third set of indicia includes a plurality of different geometric shapes.

5. An educational set of gloves as in claim 1 wherein said first set of indicia is raised for tactile stimulus.

6. An educational set of gloves as in claim 1 wherein said second set of indicia is raised for tactile stimulus.

7. An education set of gloves as in claim 1 wherein said third set of indicia having a geometric shape on said first glove and said third set of indicia having a geometric shape on said second glove are raised for tactile stimulus.

8. An educational set of gloves as in claim 1 wherein said consecutive numerical indicia are raised for each glove and said third set of indicia having a geometric shape on said first glove and said third set of indicia having a geometric shape on said second glove are raised for tactile stimulus.

9. An educational set of gloves as in claim 1 wherein said third set of indicia having a geometric shape on said first glove and said third set of indicia having a geometric shape on said second glove are raised and said second set of indicia for representing a left side and said second set of indicia for representing a right side are raised for tactile stimulus.

10. An educational set of gloves as in claim 1 wherein said first set of indicia, said second set of indicia and said third set of indicia are raised for tactile stimulus.

* * * * *